（12）United States Patent
Pless

(10) Patent No.: US 10,151,212 B2
(45) Date of Patent: Dec. 11, 2018

(54) CLAPPER ARM RETENTION DEVICE

(71) Applicant: Siemens Energy, Inc., Orlando, FL (US)

(72) Inventor: Maxwell Pless, Pittsburgh, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 169 days.

(21) Appl. No.: 15/335,664

(22) Filed: Oct. 27, 2016

(65) Prior Publication Data

US 2018/0119565 A1 May 3, 2018

(51) Int. Cl.
*F16K 27/00* (2006.01)
*F01D 17/14* (2006.01)
*F16K 1/20* (2006.01)
*F16K 27/02* (2006.01)

(52) U.S. Cl.
CPC .......... *F01D 17/145* (2013.01); *F16K 1/2028* (2013.01); *F16K 27/0209* (2013.01); *F05D 2220/31* (2013.01); *F05D 2260/30* (2013.01)

(58) Field of Classification Search
CPC . F01D 17/145; F05D 2260/30; F05D 2220/31
See application file for complete search history.

(56) References Cited

U.S. PATENT DOCUMENTS

| 4,361,446 A * | 11/1982 | Hogan ............ F16L 55/46 134/8 |
| 5,080,125 A | 1/1992 | Boski |
| 2008/0224079 A1 | 9/2008 | Maruyama et al. |
| 2016/0032794 A1 | 2/2016 | Fischer et al. |

OTHER PUBLICATIONS

Horton, Jesse, RHSV Shaft Tool Drawings, Feb. 6, 2003, Sheets 1-2, Siemens.
PCT International Search Report and Written Opinion of International Searching Authority dated Jan. 16, 2018 corresponding to PCT International Application No. PCT/US2017/055477 filed Oct. 6, 2017.

* cited by examiner

*Primary Examiner* — Richard Chang

(57) ABSTRACT

A retention device for restraining movement of a clapper arm used in a clapper valve during removal of a clapper valve shaft that extends through the clapper arm. The device includes an adapter plate mounted to a wall of a clapper valve casing wherein the adapter plate includes a hole having an internal thread. The device also includes a retaining element having an outer thread that threadably engages the internal thread. Further, the device includes a retaining end that is formed on an end of the retaining element, wherein the retaining end includes a circumferential contact surface that abuts against the clapper arm to restrain movement of the clapper arm during removal of the clapper valve shaft.

18 Claims, 6 Drawing Sheets

CLAPPER ARM RETENTION DEVICE

FIELD OF THE INVENTION

This invention relates to clapper valves used in steam turbines, and more particularly, to a retention device for restraining movement of a clapper arm during removal of a clapper valve shaft wherein the device includes an adapter plate and a retaining element having an outer thread that threadably engages an internal thread in the adapter plate and wherein the retaining element includes a retaining end having a circumferential contact surface that abuts against the clapper arm to restrain movement of the clapper arm during removal of the clapper valve shaft.

BACKGROUND OF THE INVENTION

In a steam power plant, a steam boiler is used to extract thermal energy from fuel to generate high pressure steam. The steam then flows via pipes to a steam turbine. The steam turbine converts the thermal energy of the steam into kinetic energy and uses the energy to rotate an output shaft of a generator to generate electrical power.

Several types of valves are used to control the steam during operation of a steam turbine. These include reheat stop valves, main stop valves, control valves, governors and other types of valves. The reheat and stop valves each include a clapper valve arrangement to turn steam flow on and off in the steam turbine. Referring to FIG. 1, portions of a clapper valve 10 are shown. The clapper valve 10 includes a valve disk 12 that is attached to a clapper arm 14. A rotatable clapper valve shaft 16 extends through the clapper arm 14. The shaft 16 includes a mating feature such as keys 18 that extend from the shaft 16 and into corresponding grooves in the clapper arm 14 (the keys 18 are shown spaced apart from the clapper arm 14 in FIG. 1 for purposes of illustration) such that rotation of the shaft 16 causes corresponding rotation of the clapper arm 14. In use, the clapper arm 14 may be rotated between an open position wherein the disk 12 is rotated away from a valve seat thereby opening the clapper valve 10 and enabling steam flow and a closed position wherein the disk 12 abuts against the valve seat to close the clapper valve 10 and stopping steam flow.

The clapper valve 10 is exposed to harsh conditions during operation and is periodically maintained to ensure proper operation. During maintenance, the clapper valve 10 is disassembled to enable inspection of various valve components. This includes extraction of the shaft 16 from the clapper arm 14 to determine whether bending or creep has occurred in the shaft 16. It is desirable to restrain the clapper arm 14 during removal of the shaft 16 in order to avoid damage. A plurality of axial restraints are arranged about the shaft 16 in order to restrain the clapper arm 14 while the shaft 16 is being extracted. The axial restraints are mounted to studs that extend from a clapper valve casing that houses the clapper valve 10. However, oxidation that forms on the shaft 16 during steam turbine operation renders extraction of the shaft 16 from the clapper arm 14 difficult. In particular, a large bending moment is generated during extraction of the shaft 16 that undesirably deforms one or more studs which could lead to stud damage. Further, a bushing that supports the shaft 16 along a shaft axis 20 is removed from the clapper valve casing during disassembly, thus causing the shaft 16 to be oriented or sag below the shaft axis 20 and further impedes removal of the shaft 16.

SUMMARY OF INVENTION

A retention device is disclosed for restraining movement of a clapper arm used in a clapper valve during removal of a clapper valve shaft that extends through the clapper arm. The device includes an adapter plate mounted to a wall of a clapper valve casing wherein the adapter plate includes a hole having an internal thread. The device also includes a retaining element having an outer thread that threadably engages the internal thread. Further, the device includes a retaining end that is formed on an end of the retaining element, wherein the retaining end includes a circumferential contact surface that abuts against the clapper arm to restrain movement of the clapper arm during removal of the clapper valve shaft.

In an alternate embodiment, a retention device is disclosed for restraining movement of a clapper arm used in a clapper valve during removal of a clapper valve shaft that extends through the clapper arm. The device includes an adapter plate mounted to a wall of a clapper valve casing wherein the adapter plate including a central hole. The device also includes an insert element attached to the adapter plate, wherein the insert element includes an insert portion and a flange that extends from the insert portion, wherein the insert portion includes an internal thread and the insert portion is inserted into the central hole. In addition, the device includes a retaining element having an outer thread that threadably engages the internal thread. Further, the device includes a retaining end formed on an end of the retaining element, wherein the retaining end includes a circumferential contact surface that abuts against the clapper arm to restrain movement of the clapper arm during removal of the clapper valve shaft.

Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
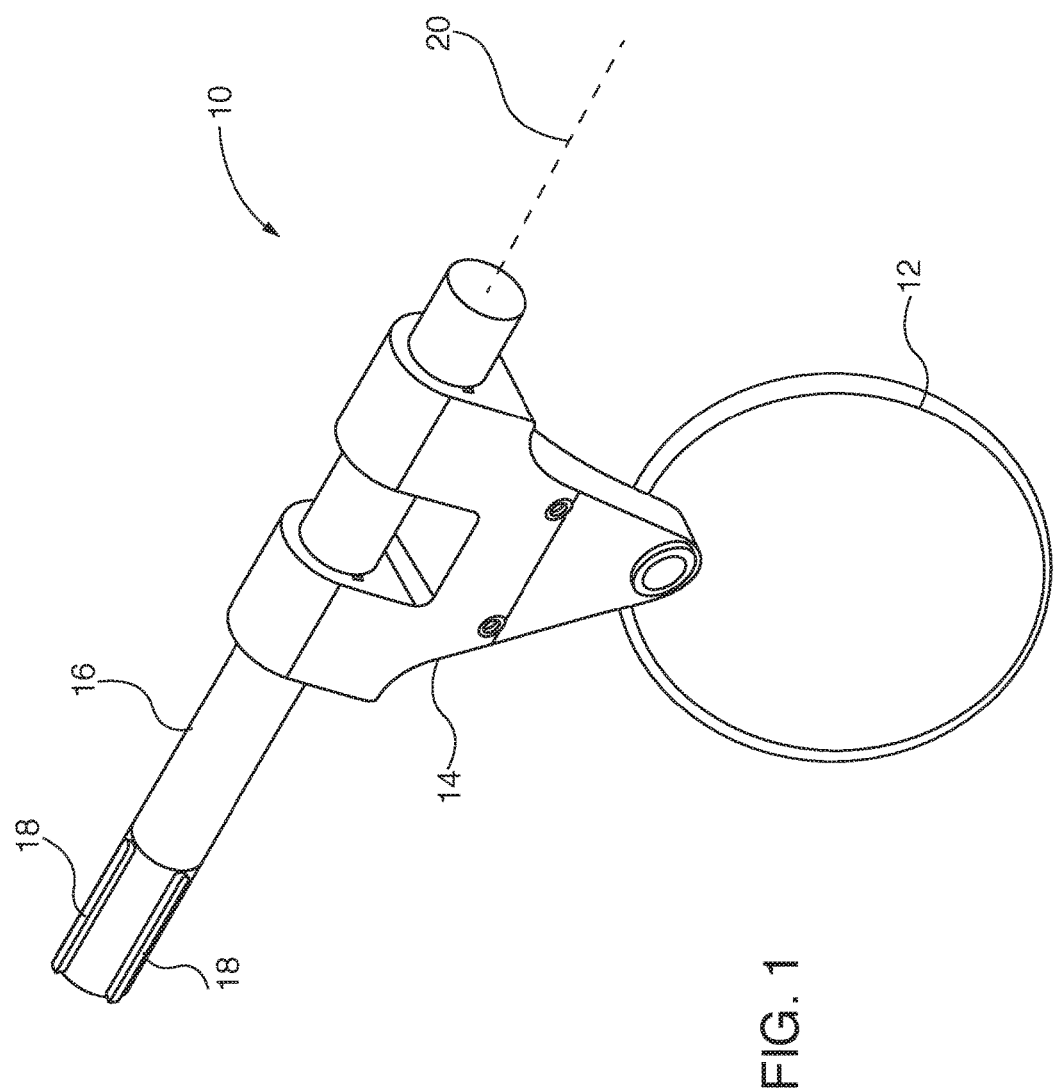
FIG. 1 illustrates portions of a clapper valve.

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 2:
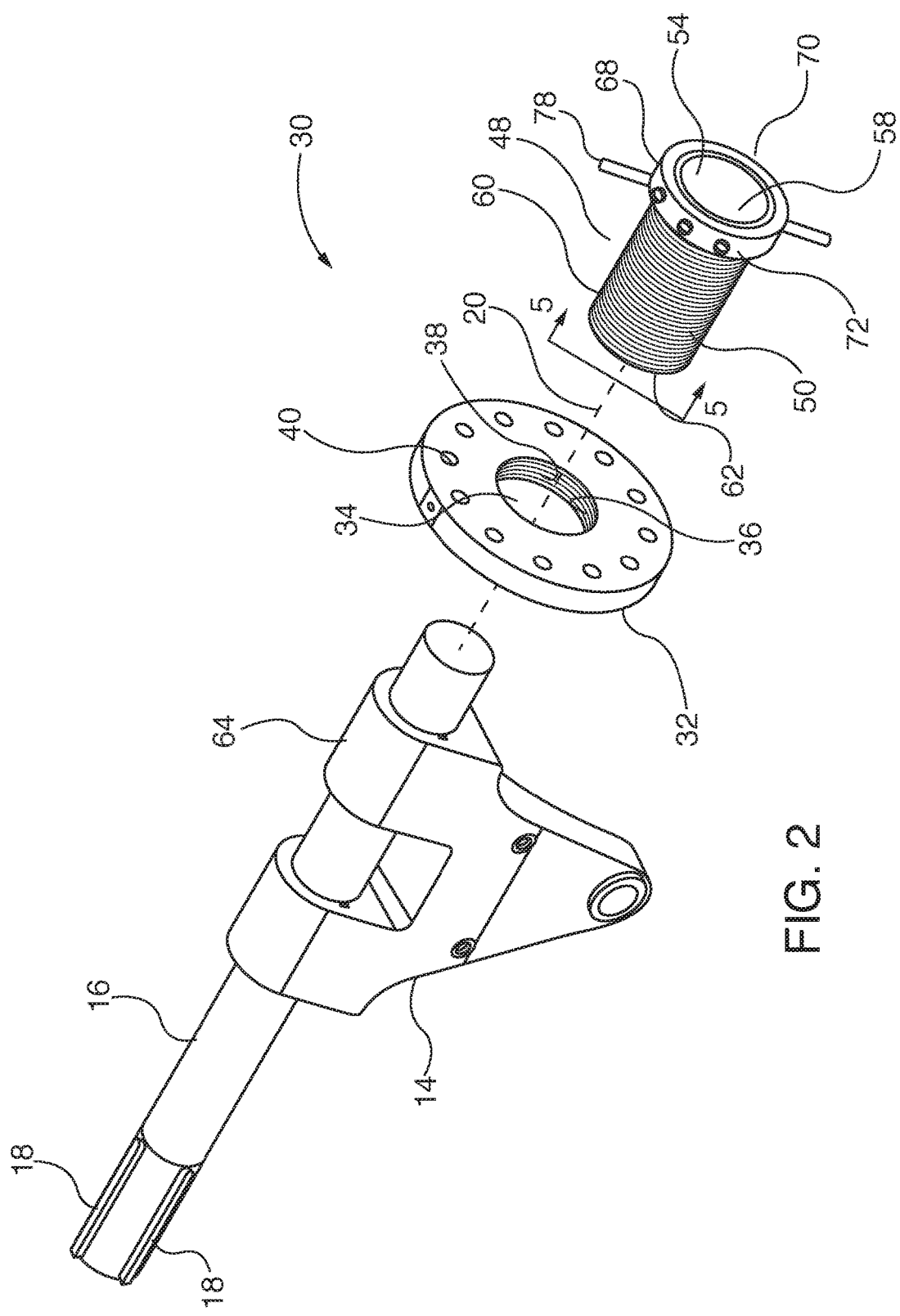
FIGS. 2 and 3 depict exploded and assembled views, respectively, of a clapper arm retention device in accordance with an aspect of the present invention.
Figure 3:
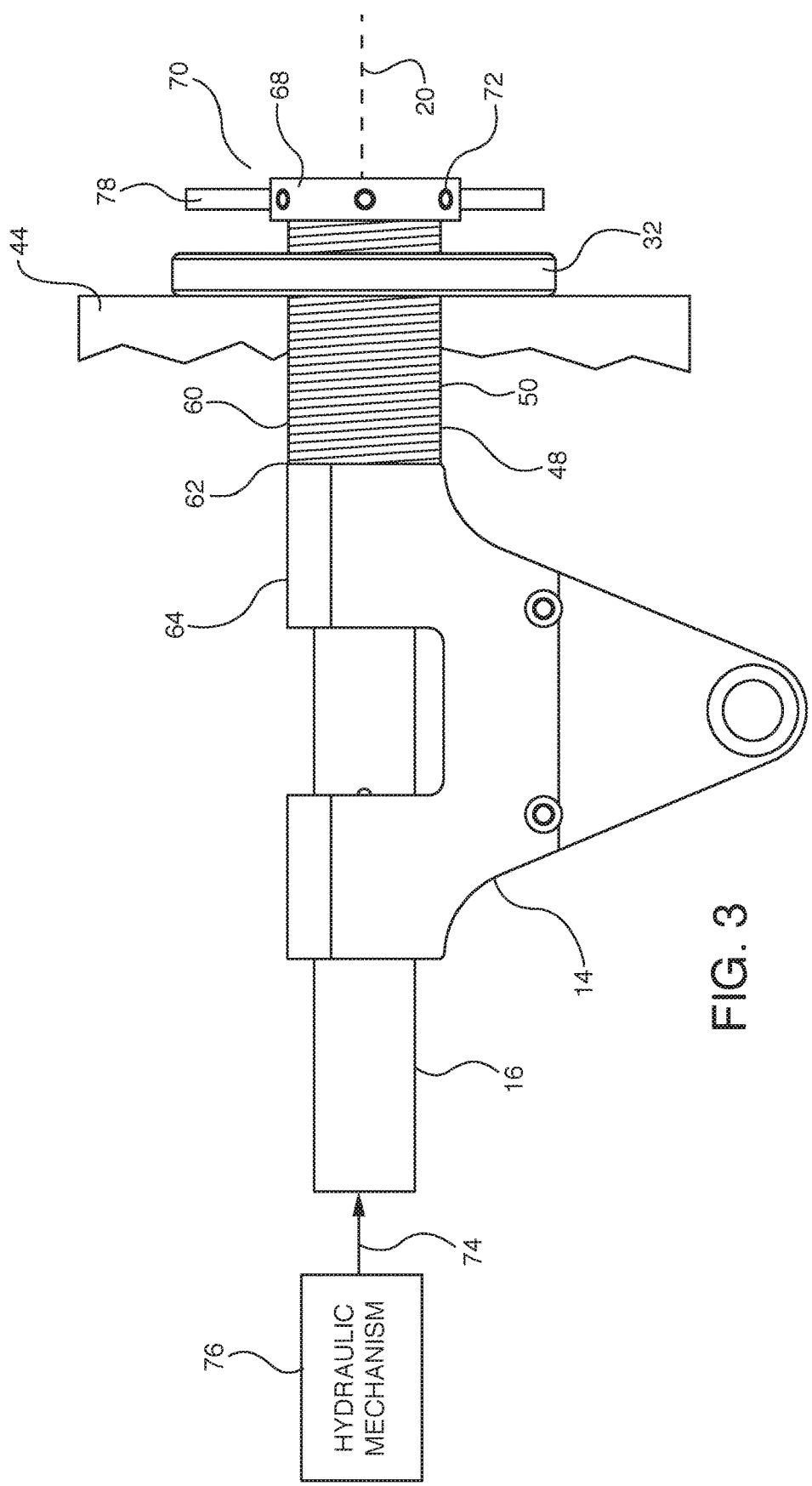

Referring to FIGS. 2 and 3, exploded and assembled views, respectively, of a clapper arm retention device 30 in accordance with an aspect of the present invention is shown. The device 30 includes an adapter plate 32 having a center hole 34 defined by an inner surface 36 having internal threads 38. The adapter plate 32 also includes a plurality of apertures 40 positioned to receive corresponding threaded studs 42 that extend from a casing wall 44 of a clapper valve casing 46 (see FIG. 4).

Figure 5:
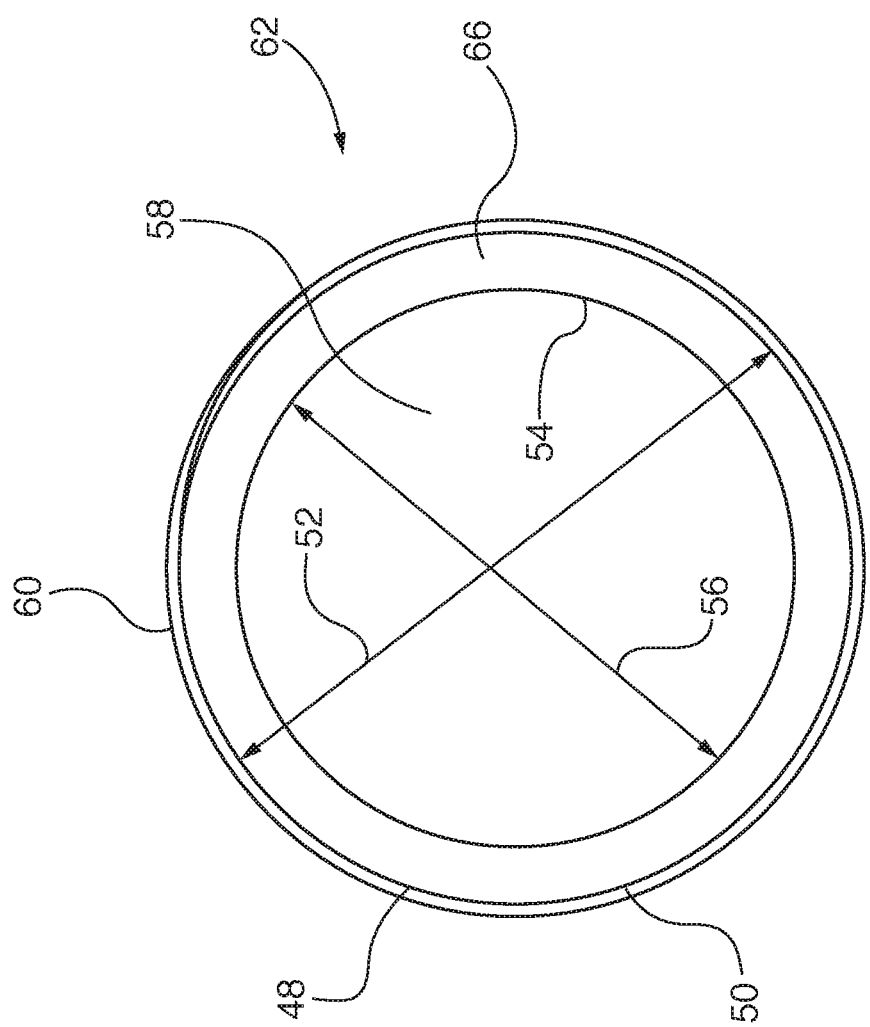
FIG. 5 is an end view of a retaining element of the device along view line 5-5 of FIG. 2.

The device 30 further includes a tube shaped retaining element 48 having a retaining end 62. FIG. 5 is an end view of the retaining element 48 along view line 5-5 of FIG. 2. Referring to FIGS. 2, 3 and 5, the retaining element 48 includes an outer surface 50 defined by an outer diameter 52 and an inner surface 54 defined by an inner diameter 56 that forms an internal channel 58 that receives the shaft 16. In use, the shaft 16 moves within the internal channel 58 as the retaining element 48 moves toward the clapper arm 14 as will be described.

The outer surface 50 includes outer threads 60 that mate with the internal threads 38 of the adapter plate 32. The retaining end 62 serves to contact a top portion 64 of the clapper arm 14 that includes a portion of the shaft 16 in order to restrain the clapper arm 14. Due to the outer 52 and inner 56 diameters, the retaining end 62 forms a circumferential contact surface 66 (see FIG. 5) to provide a substantially 360 degree contact patch that abuts against the top portion 64 of the clapper arm 14.

Referring back to FIGS. 2 and 3, the retaining element 48 includes an end stop 68 located on a first end 70 of the retaining element 48 opposite the retaining end 62. The end stop 68 includes holes 72 oriented substantially transverse to the shaft axis 20 that receive at least one bar element 78. The bar element 78 serves as a handle used by an operator to facilitate rotation of the retaining element 48 so that the retaining end 62 moves toward the clapper arm 14 and abuts the top portion 64 to tighten the retaining element 48 or to move the retaining end 48 away from the clapper arm 14 and loosen or remove the retaining element 48.

The adapter plate 32 is removeably attached to the casing wall 44 as will be described. In use, the outer threads 60 of the retaining element 48 are engaged with the internal threads 38 of the adapter plate 32 and the shaft 16 is positioned in the internal channel 58. The retaining element 48 is moved toward the clapper arm 14 by threadably engaging the threads 60, 38 until the retaining end 62 abuts against the top portion 64 of the clapper arm 14. When this occurs, the engagement of the outer threads 60 with the internal threads 38 forms a rigid connection between the retaining element 48 and the adapter plate 32 which restrains movement of the clapper arm 14. Once the clapper arm 14 is restrained, the shaft 16 is pushed (see arrow 74 in FIG. 3) through the clapper arm 14 by a hydraulic mechanism 76 in order to remove or extract the shaft 16 from the clapper arm 14. In an embodiment, a trough is used to catch the shaft 16 upon removal from the clapper arm 14.

As previously described, the retaining end 62 forms a circumferential contact surface 66 that provides a substantially 360 degree contact patch that abuts against the top portion 64 of the clapper arm 14. Thus, a load generated during shaft extraction is equally distributed on the adapter plate 32 and each of the studs 42 (see FIG. 4). As a result, each of the studs 42 are in tension during shaft extraction thereby reducing the likelihood of damage to the studs 42. Further, the threads 60, 38 enable adjustment of the retaining element 48 with respect to the clapper arm 14 to ensure full contact between the retaining end 62 and the clapper arm 14.

Figure 4:
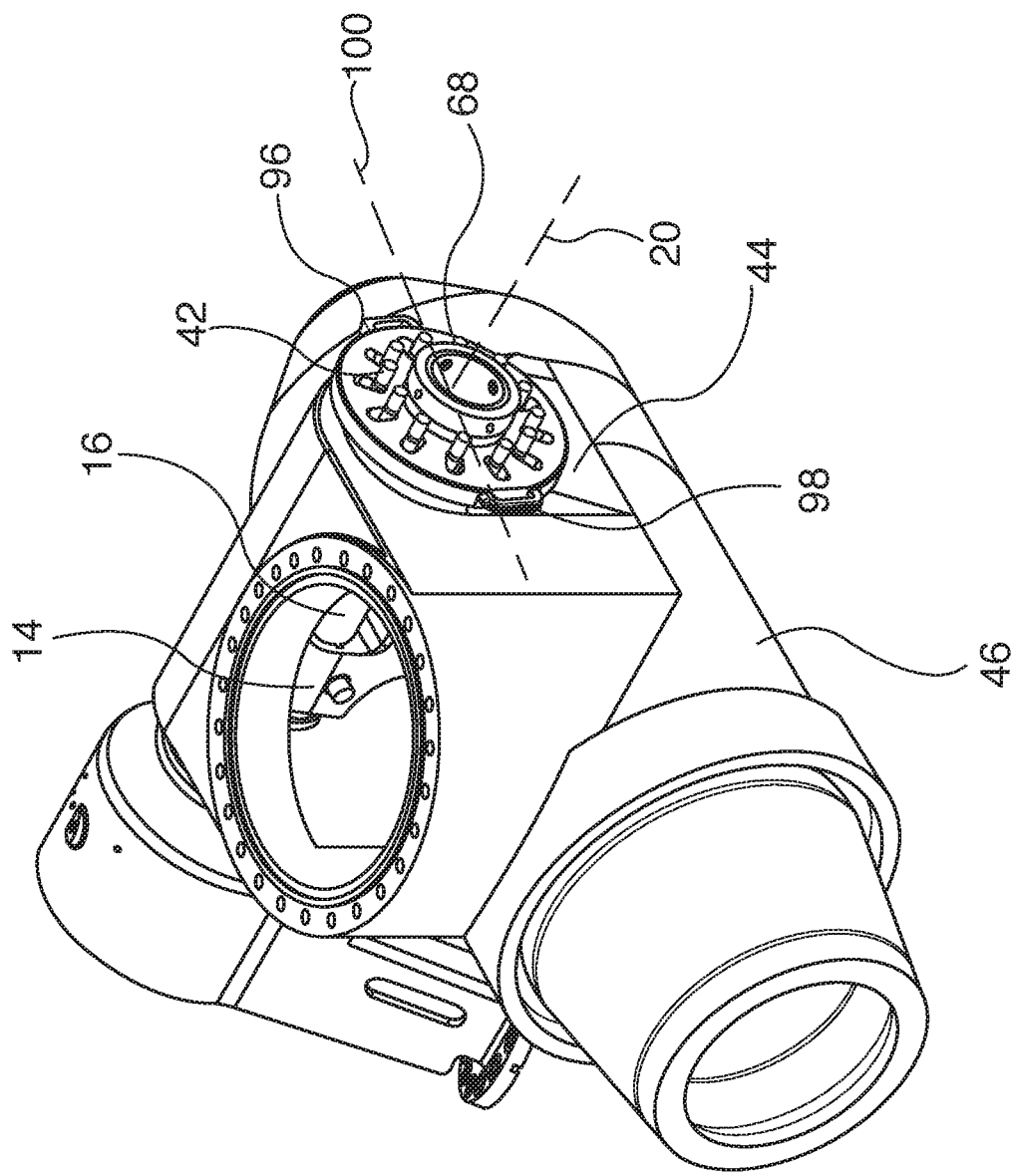
FIG. 4 is a view of the device attached to a clapper valve casing.

Referring to FIG. 4, a view of the device 30 attached to the clapper valve casing 46 is shown. In FIG. 4, top and bearing covers of the clapper valve casing 46 are shown removed for purposes of illustration. The studs 42 are normally used to attach the bearing cover. In accordance with an aspect of the invention, removal of the bearing cover during disassembly provides access to the studs 42 which are now used to attach the adapter plate 32. In use, the adapter plate 32 is positioned such that the studs 42 extend through corresponding apertures 40 to enable attachment of the adapter plate 32 to the clapper valve casing 46 with fasteners. In order to remove the shaft 16, a bushing that supports the shaft 16 along the shaft axis 20 is removed from the clapper valve casing 46. This causes an end of the shaft 16 to sag below the shaft axis 20 and further impedes removal of the shaft 16. In accordance with an aspect of the invention, the adapter plate 32 and retaining element 48 are located such that the shaft 16 is supported along the shaft axis 20 during shaft extraction.

The shaft 16 may include a mating feature such as keys 18 that extend from the shaft 16 and into corresponding grooves in the clapper arm 14 such that rotation of the shaft 16 causes corresponding rotation of the clapper arm 14. In accordance with an aspect of the invention, the inner diameter 56 of the retaining element 48 is sized to provide clearance for the keys 18 during shaft extraction in order to facilitate removal of the shaft 16 and reduce the likelihood of damage.

Figure 6:
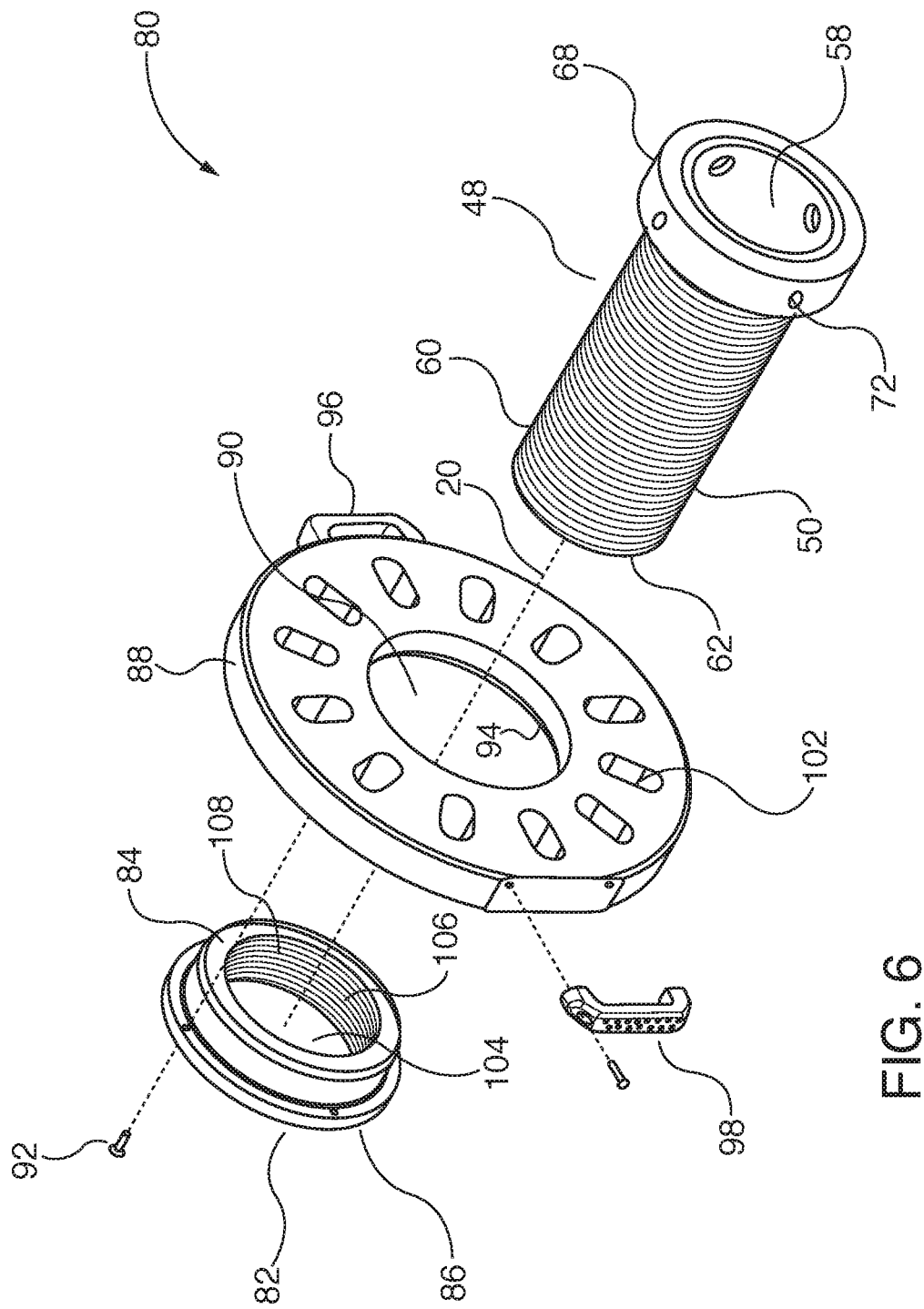
FIG. 6 is an exploded view of a clapper arm retention device in accordance with an alternate embodiment of the present invention.

Referring to FIG. 6, an exploded view of a clapper arm retention device 80 in accordance with an alternate embodiment of the present invention is shown. In this embodiment, the device 80 includes an insert element 82 having an insert portion 84 and a flange portion 86 that extends outwardly from the insert portion 84. The device 80 further includes an adapter plate 88 having a center hole 90 that is sized to receive the insert portion 84. The center hole 90 and insert portion 84 are sized to form a slip fit. The insert element 82 is removeably attached to the adapter plate 88 by fasteners 92. The adapter plate 88 also includes a cutout portion 94 that receives the flange 86 such that the flange 86 does not protrude outwardly from the adapter plate 88. First 96 and second 98 handles 96 may be mounted to a periphery of the adapter plate 88. The handles 96, 98 may be used to lift and maneuver the adapter plate 88 as desired. For example, the handles 96, 98 may be oriented asymmetrically rather than horizontally or vertically when the adapter plate 88 is properly mounted to the casing wall 44 to provide a distinctive visual indication to the operator that the adapter plate 88 has been properly mounted. For example, first 96 and second 98 handles may be oriented above and below, respectively, a horizontal axis 100 as shown in FIG. 4. The adapter plate 88 also includes a plurality of elongated apertures 102 positioned to receive the studs 42 that extend from the casing wall 44 (see FIG. 4).

The insert element 82 includes a center hole 104 defined by an inner surface 106 having internal threads 108. The outer threads 60 of the retaining element 48 mate with the internal threads 108 of the insert element 82. The internal channel 58 of the retaining element 48 is sized to receive the shaft 16 as previously described (see FIGS. 2 and 3). The retaining element 48 is moved toward the clapper arm 14 by threadably engaging the threads 60, 108 until the retaining end 62 abuts against the top portion 64 of the clapper arm 14 in order to restrain movement of the clapper arm 14 as previously described. In this embodiment, the flange 86 serves to transmit a load from the retaining element 48 to the adapter plate 88.

In order to accommodate different size clapper arms 14, different size insert elements 82 may be inserted into the adapter plate 88, thereby forming a universal adapter plate 88 that may be used with different size clapper arms 15. This reduces the number of components needed for the device 80, thus reducing complexity and cost of the device 80.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A retention device for restraining movement of a clapper arm used in a clapper valve mounted in a clapper valve casing during removal of a clapper valve shaft, wherein the clapper valve shaft extends through the clapper arm, the retention device comprising:
    an adapter plate selectively mounted to an exterior wall of the casing, the adapter plate including a central hole;
    an insert element having an insert portion arranged to pass through the central hole and a flange arranged to inhibit passage of the insert element through the central hole, the insert portion including;
    a retaining element having an outer thread that threadably engages the internal thread and a cylindrical internal channel having a diameter sized to receive the clapper valve shaft; and
    a retaining end formed on an end of the retaining element to define a circumferential contact surface that abuts against the clapper arm to restrain movement of the clapper arm during removal of the clapper valve shaft.

2. The retention device according to claim 1, wherein a load generated during removal of the clapper valve shaft is transmitted from the retaining element to the adapter plate by the flange.

3. The retention device according to claim 1, wherein the internal channel is sized to clear a mating feature that extends outwardly from the clapper valve shaft.

4. The retention device according to claim 1 further including an end stop having holes for receiving at least one bar element used to rotate the retaining element.

5. The retention device according to claim 1, wherein the adapter plate includes holes for receiving corresponding studs that extend from the casing wall.

6. The retention device according to claim 5, wherein the holes are elongated.

7. The retention device according to claim 1 further including handles mounted to the adapter plate for facilitating handling of the adapter plate.

8. A method for restraining movement of a clapper arm used in a clapper valve mounted in a clapper valve casing during removal of a clapper valve shaft, wherein the clapper valve shaft extends through the clapper arm, the method comprising:
    mounting an adapter plate to an exterior wall of the casing, the adapter plate including a central hole;
    attaching an insert element having a threaded internal bore to the adapter plate such that a portion of the insert element is disposed within the central hole;
    threading a retaining element into the insert element, the retaining element including a cylindrical internal channel;
    abutting a retaining end of the retaining element against the clapper arm to restrain movement of the clapper arm during removal of the clapper valve shaft; and
    pushing the clapper valve shaft through the retaining element to remove the clapper valve shaft.

9. The method according to claim 8, wherein a load generated during removal of the clapper valve shaft is transmitted from the retaining element to the adapter plate by the flange.

10. The method according to claim 8, wherein the internal channel is sized to clear a mating feature that extends outwardly from the clapper valve shaft.

11. The retention device according to claim 8 further including providing an end stop having holes for receiving at least one bar element used to rotate the retaining element.

12. A method for restraining movement of a clapper arm used in a clapper valve mounted in a clapper valve casing during removal of a clapper valve shaft, wherein the clapper valve shaft extends through the clapper arm, the method comprising:
    mounting an adapter plate to a wall of the casing;
    attaching an insert element to the adapter plate, wherein the insert element includes an internal bore and a flange that contacts the adapter plate to inhibit movement of the insert element along an axis defined by the internal bore;
    engaging an outer surface of a retaining element with the internal bore of the insert element to fixedly attach the retaining element to the insert element;
    abutting a retaining end formed on an end of the retaining element with the clapper arm to restrain movement of the clapper arm during removal of the clapper valve shaft; and
    transmitting a load generated during removal of the clapper valve shaft from the retaining element to the adapter plate by the flange.

13. The method according to claim 12, wherein the retaining element includes an internal channel that receives the clapper valve shaft.

14. The method according to claim 13, wherein the internal channel is sized to clear a mating feature that extends outwardly from the clapper valve shaft.

15. The method according to claim 12 further including providing an end stop having holes for receiving at least one bar element used to rotate the retaining element.

16. The method according to claim 12, wherein the adapter plate includes holes for receiving corresponding studs that extend from the casing wall.

17. The method according to claim 16, wherein the holes are elongated.

18. The method according to claim 12 further including providing handles mounted to the adapter plate for facilitating handling of the adapter plate.

* * * * *